May 15, 1962  R. D. SCHWELLENBACH  3,034,671
SELF-LEVELING BACK HOE
Filed Oct. 28, 1959  2 Sheets-Sheet 2
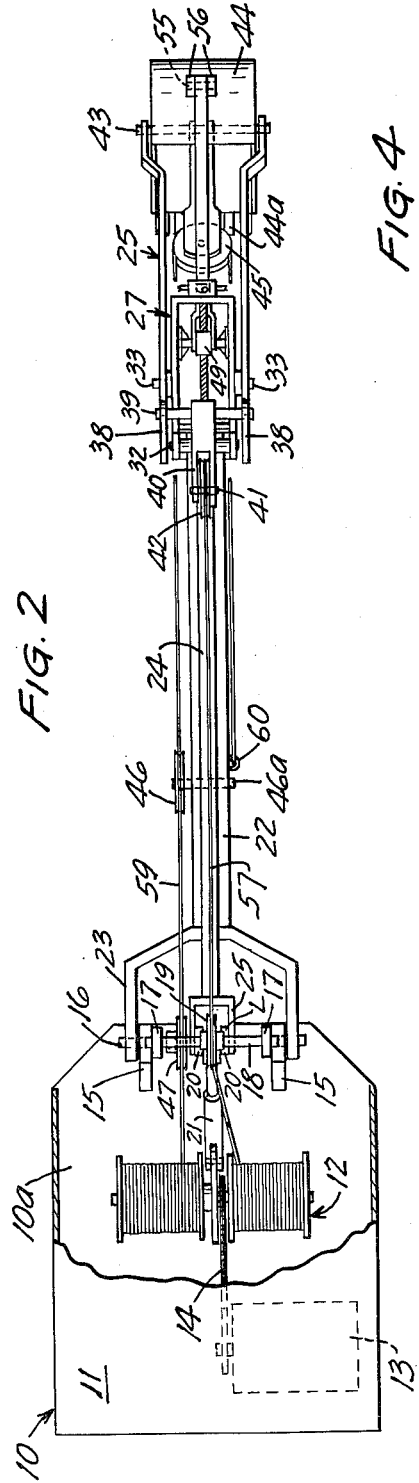
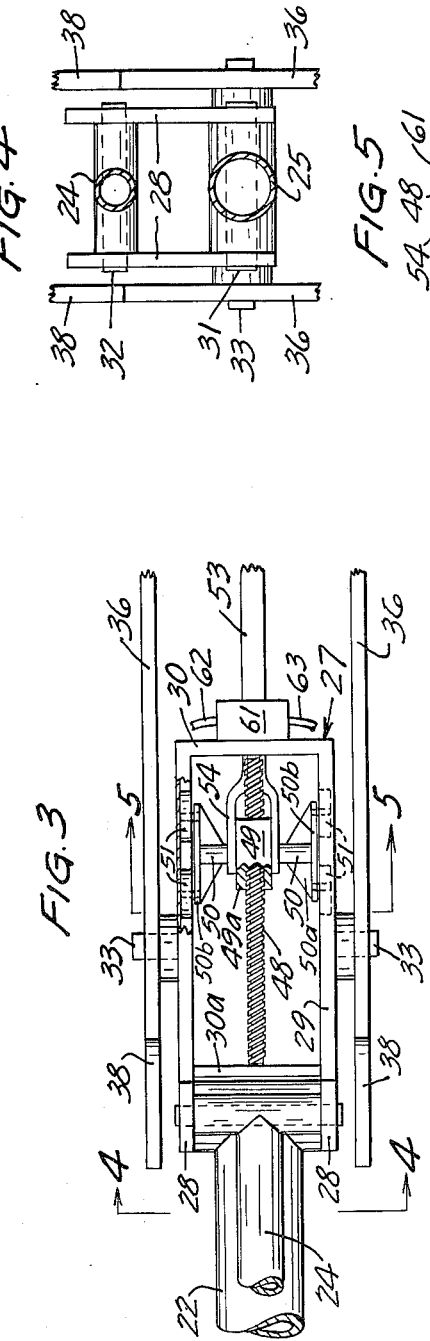
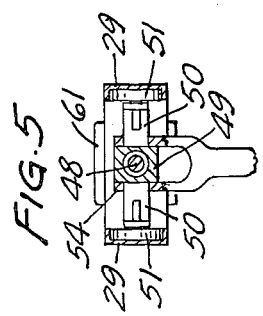
INVENTOR
ROBERT D. SCHWELLENBACH
BY
Williamson, Schroeder & Palmatier
ATTORNEYS

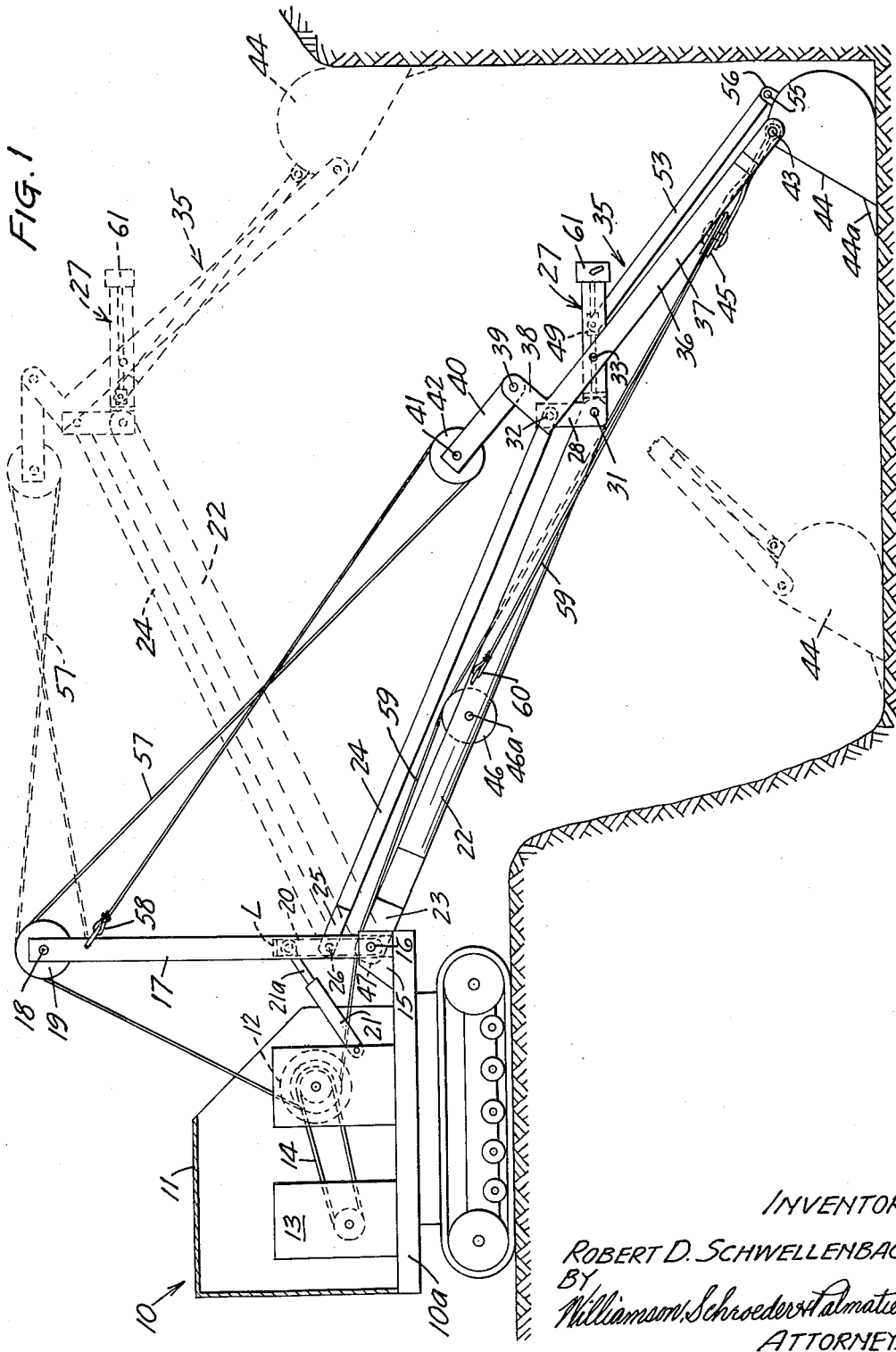

United States Patent Office 3,034,671
Patented May 15, 1962

3,034,671
SELF-LEVELING BACK HOE
Robert D. Schwellenbach, 515 Missouri Ave.,
Pierre, S. Dak.
Filed Oct. 28, 1959, Ser. No. 849,398
10 Claims. (Cl. 214—138)

This invention relates to excavating and scarifying apparatus and more particularly to excavating and scarifying apparatus of the back hoe type.

An object of this invention is to provide a novel excavating and scarifying apparatus of inexpensive construction and operation.

Another object of this invention is to provide a novel excavating and scarifying apparatus including an implement connected with a supporting and actuating linkage arranged and constructed to cause horizontal traversing movement of the implement during the excavating or scarifying operation to thereby permit level grading or scarifying over a relatively large range.

A still further object of this invention is to provide a novel earth working apparatus having an implement connected with an adjustable supporting and actuating linkage arranged and constructed to permit substantial vertical lowering of the implement and adjustable during the operation thereof to thereafter cause horizontal traversing movement of the implement.

Another object of this invention is to provide a novel earth working apparatus including an implement supported by an adjustable linkage arranged to permit horizontal traversing movement of the implement and adjustable during operation thereof to change the angle of attack of the implement to thereby effect a prying action.

These and other objects and advantages of this invention will more fully appear from the following description made in connection with the accompanying drawings, wherein like reference characters refer to the same or similar parts throughout the several views, and in which:

FIG. 1 is a side elevational view of the novel excavating and scarifying apparatus with different adjusted positions of the apparatus indicated by dotted line configuration;

FIG. 2 is a top plan view of the apparatus shown in FIG. 1 with certain parts thereof broken away and other concealed parts indicated by dotted line configuration;

FIG. 3 is an enlarged fragmentary top plan view partly in section and of the structure shown on the right side of FIG. 2;

FIG. 4 is a transverse section taken on line 4—4 of FIG. 3 and looking in the direction of the arrows; and FIG. 5 is a transverse section taken on line 5—5 of FIG. 3 and looking in the direction of the arrows.

Referring now to the drawings wherein one embodiment of my invention is shown, a conventional self-propelled mobile carriage or vehicle, designated generally as 10, includes a substantially flat platform 10a and a cab 11. Carriage 10 is of the crawler type and is provided with a cable drum mechanism 12 which is connected to a source of power or engine 13 by a drive belt 14. Rotation of the engine or motor 13, of course, imparts rotative movement to the cable drum mechanism 12 to thereby effect the winding and unwinding of cables wound thereon.

Referring now to FIGS. 1 and 2, it will be seen that the front end of platform 11 is provided with a pair of laterally spaced upstanding support lugs 15 which are interconnected by a transverse shaft 16 extending therebetween. A pair of elongated opposed support members 17 are rigidly connected to platform 11 in substantially upright relationship and are interconnected adjacent their upper ends by a transverse shaft 18. A sheave 19 is rotatably mounted on shaft 18 and it will be noted that shaft 16 extends through support member 17 adjacent the lower portions thereof. A pair of laterally spaced upright arms 20 are pivotally mounted upon shaft 16 for fore and aft rocking movement. Power means are provided for rocking arms 20 and include a hydraulic ram 21 secured to carriage 10 having its piston rod 21a pivotally secured to upright arms 20 for causing pivotal movement of the arms.

An elongated boom member 22 has one of its ends bifurcated to define a pair of arms 23 which are journalled upon shaft 16 to thereby permit pivoting of the boom in a vertical plane. Another elongated member or leveling arm 24 is positioned above and substantially parallel with boom 22 and also has one of its ends bifurcated to define a pair of arms 25 which are pivotally connected to upright arms 20 by a pivot pin 26. Leveling arm 24 is therefore swingable with boom 22 in a vertical plane.

An L-shaped frame 27 is pivotally connected to the respective outer ends of boom 22 and leveling arm 24 and includes a pair of laterally spaced vertical legs 28 each having an elongated horizontal leg 29 formed integrally therewith. Horizontal legs 29 are connected at their rear ends by rear transverse bar 30 and are connected adjacent their respective front ends by a front transverse bar 30a. Boom 22 is pivotally secured to L-shaped frame 27 by a transverse pivot pin 31 extending between the lower portions of vertical legs 28. Leveling arm 24 is secured to frame 27 by a transverse pivot pin 32 extending between the upper portions of vertical legs 28. It will be noted that upright arms 20, L-shaped frame 27, leveling arm 24 and boom 22 define a parallelogram linkage whereby the horizontal legs 29 of L-shaped frame 27 are maintained in a substantial horizontal relationship throughout the vertical swinging movement of the boom and leveling arm.

Referring now to FIGS. 1 and 3, it will be seen that horizontal legs 29 of L-shaped frame 27 are each provided with a laterally extending lug 33 positioned intermediate the ends thereof. A dipper stick,, generally designated 35, includes a pair of links 36 in the form of bell cranks and each is pivoted adjacent its upper end to one of the lugs 33. Each of the links or bell cranks 36 includes an elongated arm portion 37 and a relatively shorter arm portion 38. A cross pin 39 extends between and is journalled for rotation in the upper ends of the shorter arm portions 38. A pair of sheave supporting arms 40 are affixed to cross pins 39 and are interconnected adjacent their upper ends by pin 41 upon which a sheave 42 is journalled. Thus sheave supporting arms 40 are secured to dipper stick 35 for pivotal movement relative thereto.

The lower ends of links 36 are each journalled upon a cross pin 43 which is affixed to a scoop type bucket 44. Scoop 44 is of the conventional type and is provided with a plurality of teeth 44a and functions, of course, as an excavating or loading type implement.

A sheave 45 is secured to scoop 44 and extends rearwardly and upwardly therefrom. A cable supporting sheave 46 is rotatably mounted on boom 22 by pin 46a as seen in FIGS. 1 and 2. Another cable supporting sheave 47 is mounted for rotation about shaft 16 and cooperates with sheaves 45 and 46 for supporting a cable to be described herein below.

Referring now to FIGS. 4 and 5, it will be seen that the horizontal leg portions 29 of frame 27 are in the form of channels in cross sectional shape and define a pair of opposed tracks. An elongated screw element 48, as seen in FIG. 3, is supported by and journalled for rotation in rear transverse bar 30 and front transverse bar 30a. A traveling nut 49 is provided with a threaded bore 49a and threadedly engages elongated screw element 48 for movement thereon. It will be seen that traveling nut 48 is provided with a pair of laterally extending pins 50 each having a slotted triangular member 50a secured thereto. Triangular members 50a are each provided with a flange 50b and to which a pair of rollers 51 are rotatably secured. Each pair of rollers 51 are positioned in one of the tracks defined by horizontal legs 29 for longitudinal shifting relative thereto.

A hydraulic motor 61 is secured to rear transverse bar 30 and is drivingly connected to screw element 48 for rotating the same. Hydraulic motor 61 is provided with an inlet conduit 62 and an outlet conduit 63 which extends into the cab of the carriage whereby suitable controls, not shown, are provided.

An implement control link or rod 53 has its upper end bifurcated as at 54 which is pivotally secured to the laterally extending pins 50 on traveling nut 49. The lower end of implement control rod 53 is pivotally secured to a pin 55 extending between a pair of lugs 56 which are affixed to the scoop 44. Referring now to FIG. 1, it will be seen that the pivot mechanism which defines the pivotal connection between the control rod 53 and scoop 44 is positioned forwardly of the pivotal connection between the dipper stick 35 and scoop 44. A cable 57 has one end thereof secured to one of the uprights 17 as at 58 and is entrained over and supported by sheaves 40 and 19 and has its other end wound upon cable drum mechanism 12 as seen in FIG. 1. Cable 57 serves to raise and lower boom 22 and leveling arm 24 in a vertical plane and further functions to orient dipper stick 35. Another cable 59 has one end thereof affixed to boom 22 as at 60 and is trained over sheaves 45, 46, and 47 also shown in FIG. 1. Cable 59 also has one end thereof wound upon drum mechanism 12 and serves to drag or pull the scoop rearwardly thus causing pivoting of dipper stick 35. It is pointed out that a hydraulic system may be employed for operating the apparatus rather than the cable arrangement shown.

Referring now to FIG. 1, the apparatus is shown in one position in full line configuration and is shown in other positions in dotted line configuration. It will be noted that the full line configuration shows the actuating nut 49, which in effect defines the pivotal axis of control rod 53, positioned forwardly of the pivotal axis 33 of dipper stick 35. When the traveling nut 48 is so disposed, dipper stick 35 and control rod 53 are disposed in substantially parallel relation and cooperate with L-shaped frame 27 and scoop 44 to define a second parallelogram linkage. With this arrangement, the movement of the implement will be substantially straight from the point of initial contact with the earth to a point when the implement is elevated and will be maintained in a horizontal relationship throughout the movement of the entire mechanism. This permits the implement to work evenly over a substantially wide range which is a substantially different effect than that of the arcuate movement of an implement used on conventional back hoe apparatus. A level indicator L is affixed to the upper end of one of the arms 20 to permit the operator to know the precise disposition of the scoop when he is unable to visually see the scoop. It will also be noted that when the apparatus is working in substantially compact earth, the dipper stick 35 and control rod 53 will cause boom 22 to be raised upwardly thus obviating the necessity of constantly adjusting the boom. Thus it will be seen that my apparatus is self-leveling during the excavating or scarifying operation.

When it is desirable to use my novel apparatus as a conventional back hoe, actuating nut 49 is moved rearwardly until the pivotal axis of the control rod 53 is substantially co-axial with the pivotal axis of the dipper stick 35 whereby the implement will describe a substantially vertical arc during its movement.

On some occasions it is desirable to dig vertically or it is necessary to have the implement lowered in a substantially vertical plane especially when there is limited operating room or the excavation is closely adjacent a building. To accomplish this, the hydraulic motor 61 is energized to drive actuating screw 48 which in turn imparts movement to traveling nut 49 so that the pivotal axis of the control rod 53 is moved substantially rearwardly of the axis of pivot of the dipper stick as shown in the upper dotted line configuration in FIG. 1. This permits substantial vertical lowering of the implement and the implement may thereafter be re-positioned by automatically moving the actuating nut 49 substantially forwardly of the pivotal axis of dipper stick 35.

Quite often embedded objects such as a rock or the like will interfere with the even grading operation and, of course, must be removed. If the actuating nut 49 is positioned forwardly of the pivotal axis of the dipper stick so that the dipper stick and control link are in substantial parallel relation, the actuating nut 49 can then be moved rearwardly to thereby incline the teeth of the scoop downwardly. This is done when the implement engages an embedded object such as a rock and a prying action can be effected for removing the object.

It is to be understood that other implements besides a scoop may be used with my apparatus such as back fill blades, slope drags, and frost and hard pan ripper tooth attachments. It is also pointed out that implements for forming trenches may be utilized with my apparatus to thereby permit my apparatus to function as a trenching machine.

It will be noted from the preceding paragraphs that I have provided a novel earth working apparatus utilizing two systems, a parallelogram linkage for actuating an implement whereby the implement may excavate or scarify on an even grade over a substantial wide range. My uniquely arranged linkage also permits the implement to be maintained in a predetermined position throughout an entire cycle of movement of the apparatus.

It will be seen that my apparatus is arranged and constructed to be quickly adjusted during operation thereof to vary the angle of attack of the implement from a position for even grading to a position to effect a prying action on embedded objects. It will also be noted that my apparatus is also adjustable to permit the implement to be lowered in a substantially vertical plane whereby the implement may be used to excavate in areas where space is limited or adjacent the wall of a building. My apparatus is also readily adjustable to function as a conventional back hoe which is a feature heretofore unknown.

Thus it will be seen from the foregoing description that I have provided a novel earth working apparatus which is automatically adjustable for multi-functional uses. This multi-functional usage permits my apparatus to operate in the manner of different kinds of earth working machines thus obviating the necessity of requiring a different machine for performing each of these different functions.

It will, of course, be understood that various changes may be made in the form, details, arrangement and proportions of the parts without departing from the scope of my invention which consists of the matter shown and described herein and set forth in the appended claims.

What is claimed is:

1. Excavating apparatus comprising a mobile carriage, an upper and a lower elongate member each being pivotally connected adjacent one end thereof to said carriage for swinging movement in a vertical plane, said members being disposed in substantially parallel relation and extending forwardly from said carriage, a frame pivotally connected to said members at their respective other ends, a dipper stick hingedly connected at one end thereof to said frame for fore and aft rocking about a horizontal axis, an implement pivotally connected to the other end of said dipper stick, means for raising and lowering said members and for orienting said dipper stick, means connected with said implement for rocking said dipper stick, a link having one end thereof pivotally conected to said implement, and pivot mechanism pivotally connected to the other end of said link and being shiftably mounted on said frame for reciprocating movement relative thereto between a point spaced rearwardly of the dipper stick axis of pivot and a point substantially co-axial with said dipper stick axis of pivot.

2. Excavating apparatus comprising a mobile carriage, an upper and a lower elongate member each being pivotally connected adjacent one end thereof to said carriage for swinging movement in a vertical plane, said members being disposed in substantially parallel relation and extending forwardly from said carriage, a frame pivotally connected to said members at their respective other ends, a dipper stick hingedly connected at one end thereof to said frame for fore and aft rocking about a horizontal axis, an implement pivotally connected to the other end of said dipper stick, means for raising and lowering said members and for orienting said dipper stick, means connected with said implement for rocking said dipper stick, a link having one end thereof pivotally connected to said implement, a pivot element pivotally connected to the other end of said link and shiftably mounted on said frame for reciprocating movement relative thereto, power means operatively connected with said pivot element for shifting said pivot element rearwardly on said frame from a point spaced forwardly of the dipper stick axis of pivot to a point substantially co-axial with the dipper stick axis of pivot.

3. Excavating apparatus comprising a mobile carriage, an upper and a lower elongate member each being pivotally connected adjacent one end thereof to said carriage for swinging movement in a vertical plane, said members being disposed in substantially parallel relation and extending forwardly from said carriage, a frame pivotally connected to said members at their respective other ends, a dipper stick hingedly connected at one end thereof to said frame for fore and aft rocking about a horizontal axis, an implement pivotally connected to the other ends of said dipper stick, means for raising and lowering said members and for orienting said dipper stick, means connected with said implement for rocking said dipper stick, a link having one end thereof connected to said implement, a pivot element pivotally connected to the other end of said link and being shiftably mounted on said frame for reciprocating movement relative thereto, power means operatively connected with said pivot element for shifting said pivot element rearwardly on said frame from a point spaced forwardly of the dipper stick axis of pivot to a point rearwardly of the dipper stick axis of pivot.

4. Excavating apparatus comprising a mobile carriage, a boom pivotally connected at one end thereof to said carriage, a leveling arm positioned above and substantially parallel to said boom and being pivotally connected at one end thereof to said carriage, said boom and leveling arm extending forwardly of said carriage and being swingable in a vertical plane, an L-shaped frame pivotally connected to said boom and leveling arms at their respective other ends, a dipper stick hingedly connected adjacent one end thereof to said frame for fore and aft rocking about a horizontal axis, an implement pivotally connected to the other end of said dipper stick, means for raising and lowering said boom and leveling arm and for orienting said dipper stick, means connected with said implement for rocking said dipper stick, an implement control link having one end thereof pivotally connected to said implement, a pivot element pivotally connected to the other end of said link and being shiftably mounted on said frame for longitudinal reciprocating movement relative thereto, power means operatively connected with said element for shifting said element rearwardly on said frame from a point spaced forwardly of said dipper stick axis of pivot to a point spaced substantially rearwardly of the dipper stick axis of pivot whereby said implement may be lowered in a substantially vertical plane.

5. Excavating apparatus comprising a mobile carriage having an arm pivotally connected thereto in substantially upright relation for fore and aft rocking about a horizontal axis, power means connected to said upright arm for causing fore and aft rocking thereof, a boom having one end thereof pivotally connected to said carriage, an elongate leveling arm having one end thereof pivotally connected to said upright arm and being positioned above and substantially parallel to said boom, said leveling arm and boom being swingable in a vertical plane and extending forwardly of said carriage, an L-shaped frame pivotally connected to said boom and leveling arm at their respective other ends, a dipper stick hingedly connected at one end thereof to said frame for fore and aft rocking about a horizontal axis, an implement pivotally connected to the other end of said dipper stick, means for raising and lowering said boom and arm and for orienting said dipper stick, means connected with said implement for rocking said dipper stick, an implement control link having one end thereof pivotally connected to said implement, a pivot element pivotally connected to the other end of said control link and being shiftably mounted on said frame for longitudinal shifting movement relative thereto, power means operatively connected with said element for shifting said element rearwardly from a point spaced forwardly of said dipper stick axis of pivot to a point spaced substantially rearwardly of the dipper stick axis of pivot.

6. The structure as defined in claim 5 wherein said dipper stick comprises a pair of laterally spaced bell cranks interconnected adjacent one end thereof.

7. In an excavating apparatus, a pair of vertically spaced elongated members disposed in substantially parallel relation and swingable in a vertical plane, an L-shaped frame pivotally connected to one end of each of said members and comprising an upright portion and a substantially elongated horizontal portion, a dipper stick connected at one end thereof to said elongated horizontal portion of said frame for fore and aft rocking about a horizontal axis, an implement pivotally connected to the other end of said dipper stick, means for raising and lowering said members and for orienting said dipper stick, means for rocking said dipper stick, an implement control link having one end thereof connected to said implement, a pivot element pivotally connected to the other end of said control link and being shiftably mounted on the horizontal portion of said L-shaped frame for longitudinal reciprocating movement relative thereto, power means operatively connected with said pivot element for shifting said pivot element rearwardly on said horizontal portion from a point spaced forwardly of the dipper stick axis of pivot to a point spaced substantially rearwardly of the dipper stick axis of pivot.

8. In an excavating apparatus, a pair of vertically spaced elongated members disposed in substantially parallel relation and swingable in the vertical plane, a frame member pivotally connected to one end of each of said members, a dipper stick hingedly connected at one end thereof to said frame for fore and aft rocking about a horizontal axis, an implement pivotally connected to the other end of said dipper stick, means for raising and lowering said boom members and for orienting said dipper stick, means connected with said implement for rocking said dipper stick, a link having one end thereof pivotally connected to said implement, and pivot mechanism pivotally connected with the other end of said link and being shiftably mounted on said frame for reciprocating movement relative thereto between a point spaced rearwardly of the dipper stick axis of pivot and a point substantially co-axial with said dipper stick axis of pivot.

9. The structure as defined in claim 8 wherein said dipper stick comprises a pair of laterally spaced bell crank members connected adjacent one end thereof.

10. The structure as defined in claim 8 wherein said frame includes an elongated horizontal portion defining a pair of opposed tracks engageable by said link pivot means.

References Cited in the file of this patent

UNITED STATES PATENTS

| | | |
|---|---|---|
| 1,489,042 | Pugh | Apr. 1, 1924 |
| 1,693,809 | Clutter | Dec. 4, 1928 |
| 2,000,150 | Siebert | May 7, 1935 |
| 2,788,906 | Davis | Apr. 16, 1957 |